(12) United States Patent
Shimada

(10) Patent No.: US 6,275,305 B1
(45) Date of Patent: *Aug. 14, 2001

(54) INFORMATION TRANSMITTING APPARATUS

(75) Inventor: Kazutoshi Shimada, Yokosuka (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/559,722

(22) Filed: Nov. 15, 1995

(30) Foreign Application Priority Data

Nov. 18, 1994 (JP) .................................................. 6-285049

(51) Int. Cl.$^7$ .............................. H04N 1/00; H04N 1/32; H04M 11/00
(52) U.S. Cl. ...................... 358/434; 358/468; 379/100.01
(58) Field of Search .................................... 358/434, 400, 358/401, 404, 435, 468, 479; 379/100.01; 348/552, 555, 563, 564, 569, 554

(56) References Cited

U.S. PATENT DOCUMENTS

| | | | |
|---|---|---|---|
| 4,416,182 | * | 11/1983 | Wise et al. .......................... 84/470 R |
| 4,602,295 | * | 7/1986 | Moriyama ............................ 358/343 |
| 5,109,399 | * | 4/1992 | Thompson ............................. 379/45 |
| 5,138,450 | * | 8/1992 | Fukuda et al. ........................ 358/147 |
| 5,164,904 | * | 11/1992 | Sumner ................................. 364/436 |
| 5,291,556 | * | 3/1994 | Gale ..................................... 381/17 |
| 5,309,248 | * | 5/1994 | Polidori ................................ 358/335 |
| 5,317,628 | * | 5/1994 | Mishoci et al. ........................ 379/89 |
| 5,318,450 | * | 6/1994 | Carver .................................. 434/336 |
| 5,341,374 | * | 8/1994 | Lewen et al. ....................... 370/85.4 |
| 5,441,047 | * | 8/1995 | David et al. .......................... 128/670 |
| 5,452,217 | * | 9/1995 | Kishi et al. ........................... 364/449 |
| 5,457,780 | * | 10/1995 | Shaw et al. .......................... 395/165 |

(List continued on next page.)

FOREIGN PATENT DOCUMENTS

| | | |
|---|---|---|
| 0 574 138 | 12/1993 | (EP) . |
| 0 663 771 | 7/1995 | (EP) . |
| 5-069917 | * 3/1993 | (JP) . |

OTHER PUBLICATIONS

Shinju Horiguchi et al., New Generation Database Systems for Still Picture Visual Communication—The HI–Captain Series–, NTT Review, vol. 3, No. 5, Sep. 1, 1991.

European Search Report in a corresponding foreign application which cites the references disclosed in this Form PTO–1449.

Gregg Williams, "HyperCard First Impression", *Byte*, 109–115, Dec. 1987.

Danny Goodman, "*The Complete HyperCard Handbook*", Bantam Books, pp. 605–615, 1988.

"HyperCard Reference Manual", Apple Computer, Inc. pp. 4.2–4.8, 1993.

*Primary Examiner*—Madeleine Nguyen
(74) *Attorney, Agent, or Firm*—Morgan & Finnegan LLP

(57) ABSTRACT

Image information to be transmitted is formed, audio information and coordinates information which is made correspond to the audio information and to a position of the image information are formed. The image information, audio information, and coordinates information are transmitted by a single communication. When receiving, the image information, audio information, and coordinates information which is made correspond to the audio information and to the position of the image information are received. The image information and audio information are reproduced. The position indicated by the coordinates information is displayed on the image. The contents of the image can be further easily understood on the reception side of the image. Such a display is realized by a simple system.

52 Claims, 15 Drawing Sheets

U.S. PATENT DOCUMENTS

| | | | |
|---|---|---|---|
| 5,475,598 | * 12/1995 | Fushimi et al. | 364/444 |
| 5,499,921 | * 3/1996 | Sone | 434/307 A |
| 5,524,051 | * 6/1996 | Ryan | 380/9 |
| 5,543,939 | * 8/1996 | Harvey et al. | 358/426 |
| 5,548,346 | * 8/1996 | Mimura et al. | 348/738 |
| 5,550,649 | * 8/1996 | Wong et al. | 358/479 |
| 5,561,709 | * 10/1996 | Remillard | 379/96 |
| 5,566,271 | * 10/1996 | Tomitsuka et al. | 395/2.84 |
| 5,581,783 | * 12/1996 | Ohashi | 395/825 |
| 5,671,019 | * 9/1997 | Isoe et al. | 348/565 |

* cited by examiner

AUDIO
"YOU HAVE FORGOTTEN TO CARRY.
ANSWER IS 23."

AUDIO
"TURNING TO THE DIRECTION OF
ACUTE ANGLE AT THIS JUNCTION
OF FIVE ROADS AND NEXT TURNING
TO RIGHT AT A BOOK STORE,
YOU WILL FIND MY HOUSE WHICH
IS THE THIRD FROM THE JUNCTION"

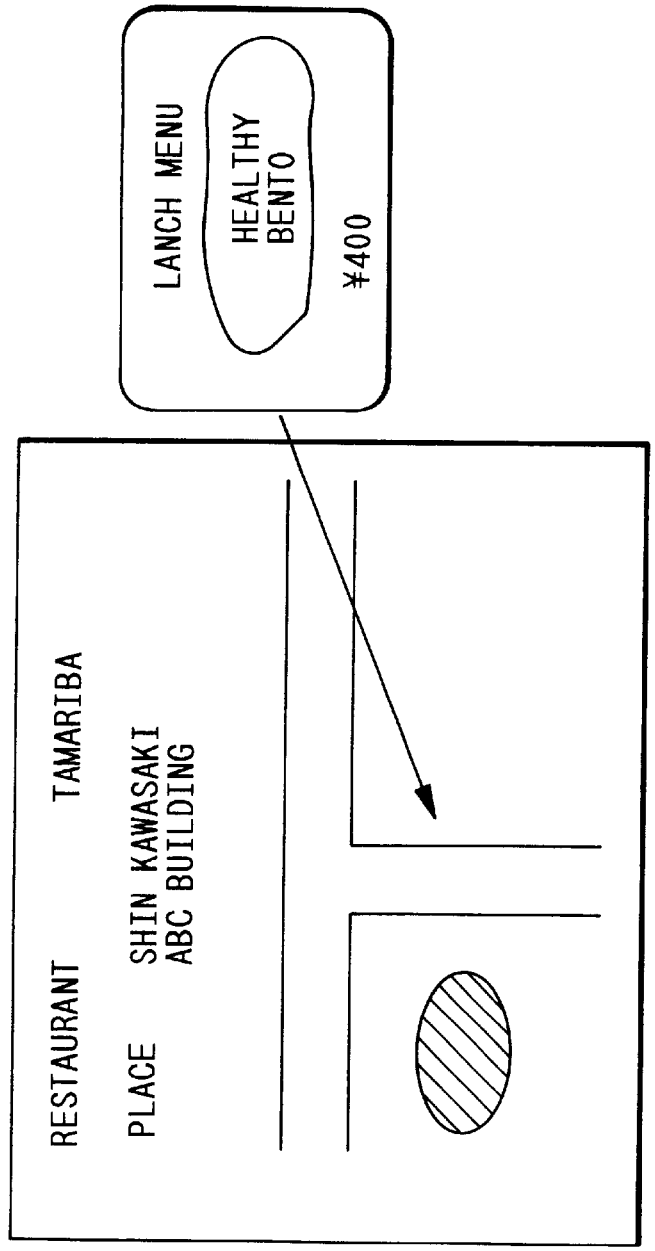

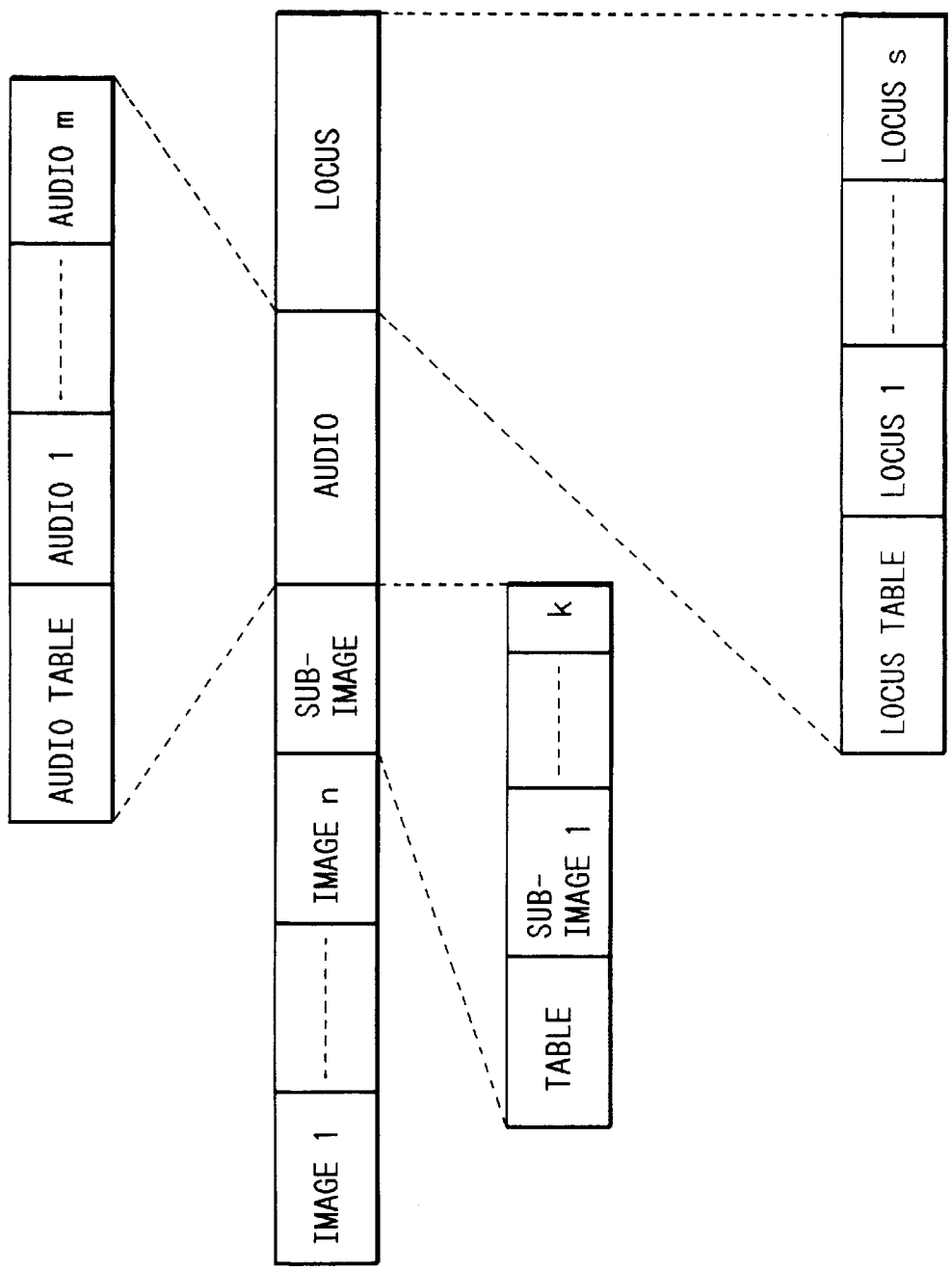

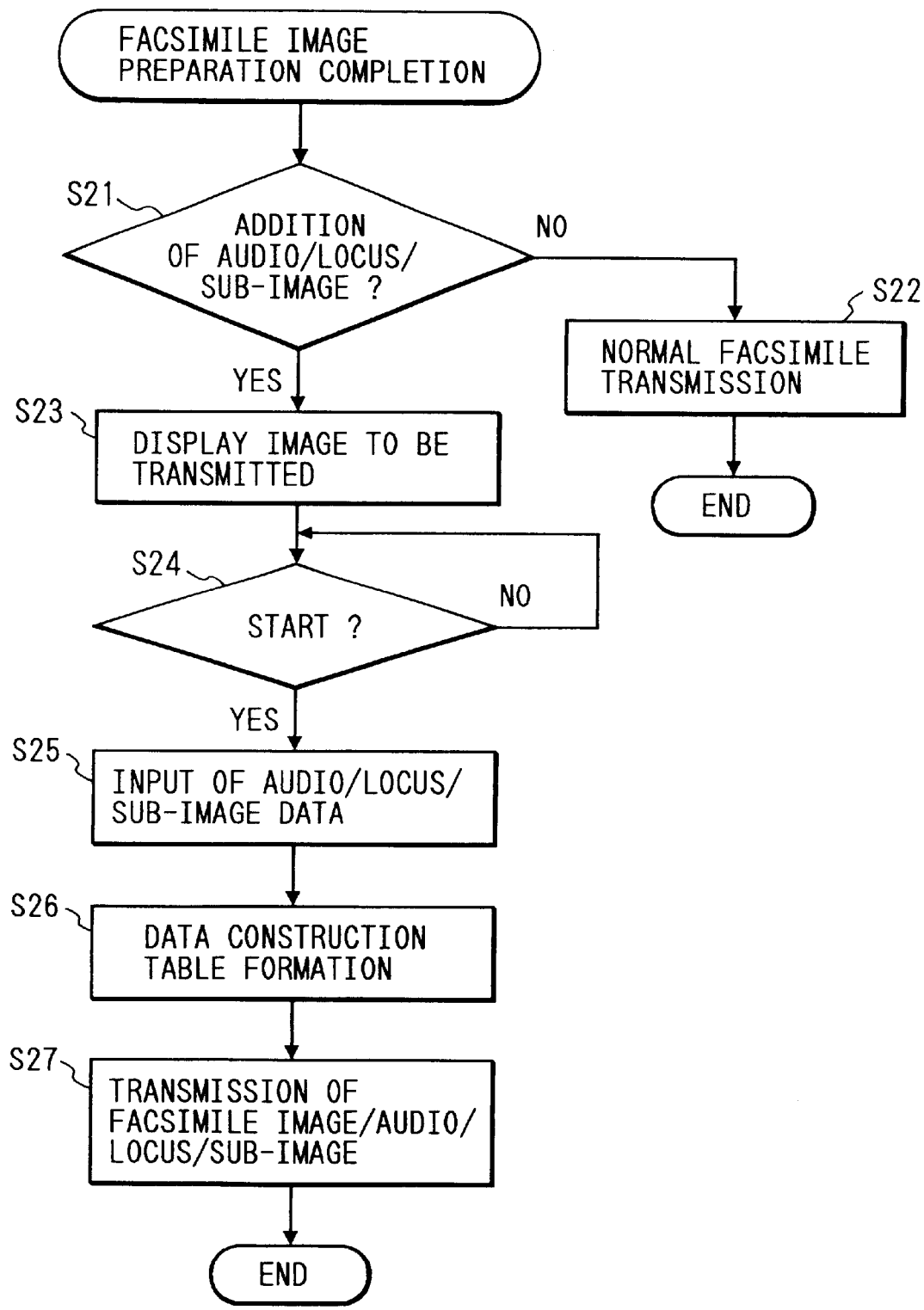

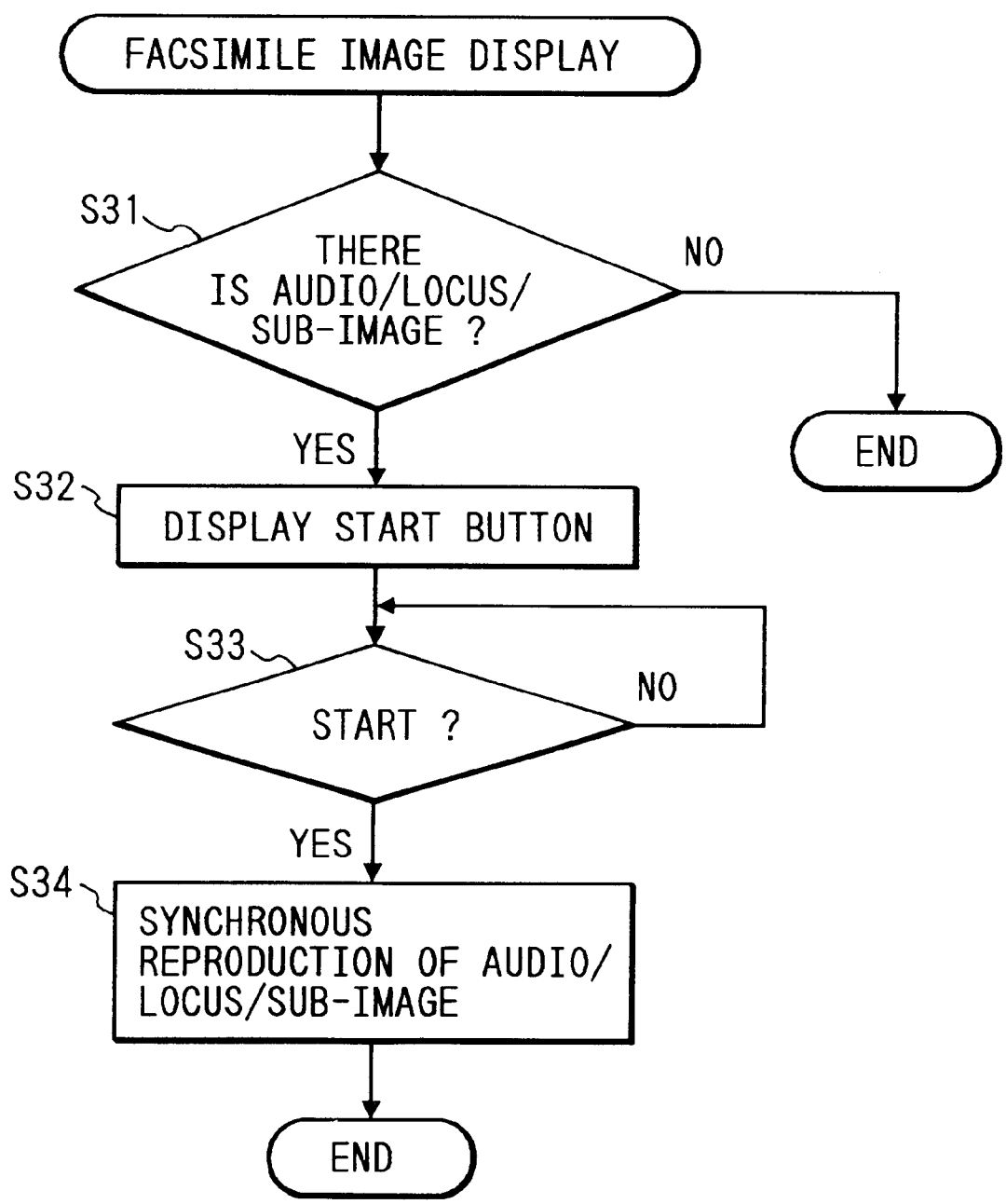

INFORMATION TRANSMITTING APPARATUS

BACKGROUND OF THE INVENTION

1. Field of the Invention

The present invention relates to an information transmitting apparatus for transmitting information through a communication line or the like and, more particularly, to an information transmitting apparatus for transmitting an image to be transmitted by a facsimile signal or the like.

2. Related Background Art

In recent years, the costs and size of a facsimile apparatus have been being more and more reduced and is being rapidly spread to various fields from a small-scale office to a general home. In addition to a thermal paper, a normal paper can be also used as a recording paper and a using method is also made variable. For example, a supplementary school and a preparatory school uses the facsimile apparatus to instruct and provide information, thereby enabling a home study to be performed. Although the lesson using a satellite communication has already been put into practical use, an attention is paid to the facsimile communication from viewpoints such that the teaching can be performed every person and a large equipment investment is unnecessary. Consequently, for example, a good instruction can be immediately received even at a remote location.

An information presentation by the facsimile apparatus is fairly spread by the introduction of a facsimile server on the enterprise side. Even from the user side, although it is troublesome to request references by a telephone, since by merely calling an information presenting station by the facsimile apparatus and dialing the necessary information numbers, a desired reference can be transmitted via the facsimile, it is very convenient. In future, there will be many cases where it is sufficient to receive various information for admission or the like by merely transmitting and receiving via the facsimile apparatus.

It is one of advantages of the facsimile apparatus that an instantaneousness is unnecessary in a manner similar to an answering telephone or an electronic mail. The user can receive information any time and it is sufficient for the user to read it as necessary.

On the other hand, a telewriting, electronic conference, cooperative work, or the like is effective for explanation, conference, or the like which requires an instantaneousness because information such as voice, image, locus, and the like are simultaneously transmitted to each terminal.

According to the conventional apparatus, the facsimile apparatus merely transmits a still image such as a drawing or the like and, in case of needing a description, it is necessary to make sentences of such an explanation and to transmit them together with the still image. In future, even in case of an information presentation to many unspecified or specified persons as well as the communication between the specified persons, it is insufficient to raise an understanding degree of references by only the image information and it is effective to add a voice or information indicative of a specified portion. Such a system has already been put into practical use as a television telephone, television conference system, video conference system, video mail, or the like. However, since they need a very expensive information processing apparatus of a high performance, they cannot be generally easily used.

SUMMARY OF THE INVENTION

It is an object of the invention to solve the above problems.

Another object of the invention is to provide an information transmitting apparatus which can effectively transmit both of image information as main information and information to effectively use such an image.

Under such an object, according to one aspect of the present invention, there is provided an information transmitting apparatus for transmitting a voice and a sub-image or coordinates data together with main image information by a data format in which they are made correspond to each other.

The above and other objects and features of the present invention will become apparent from the following detailed description and the appended claims with reference to the accompanying drawings.

BRIEF DESCRIPTION OF THE DRAWINGS

FIG. 13 is a diagram showing an example of a display picture plane including a sub-image in the apparatus of FIG. 1;

FIG. 14 is a diagram showing a format of transmission data including a main image, a sub-image, a voice, and a locus in the apparatus of FIG. 1;

FIG. 15 is a flowchart showing the fundamental operation in case of transmitting the sub-image also in the apparatus of FIG. 1; and FIG. 16 is a flowchart showing the fundamental operation in case of receiving the sub-image also in the apparatus of FIG. 1.

DETAILED DESCRIPTION OF THE PREFERRED EMBODIMENTS

An embodiment of the invention will now be described in detail hereinbelow with reference to the drawings.

Figure 1:
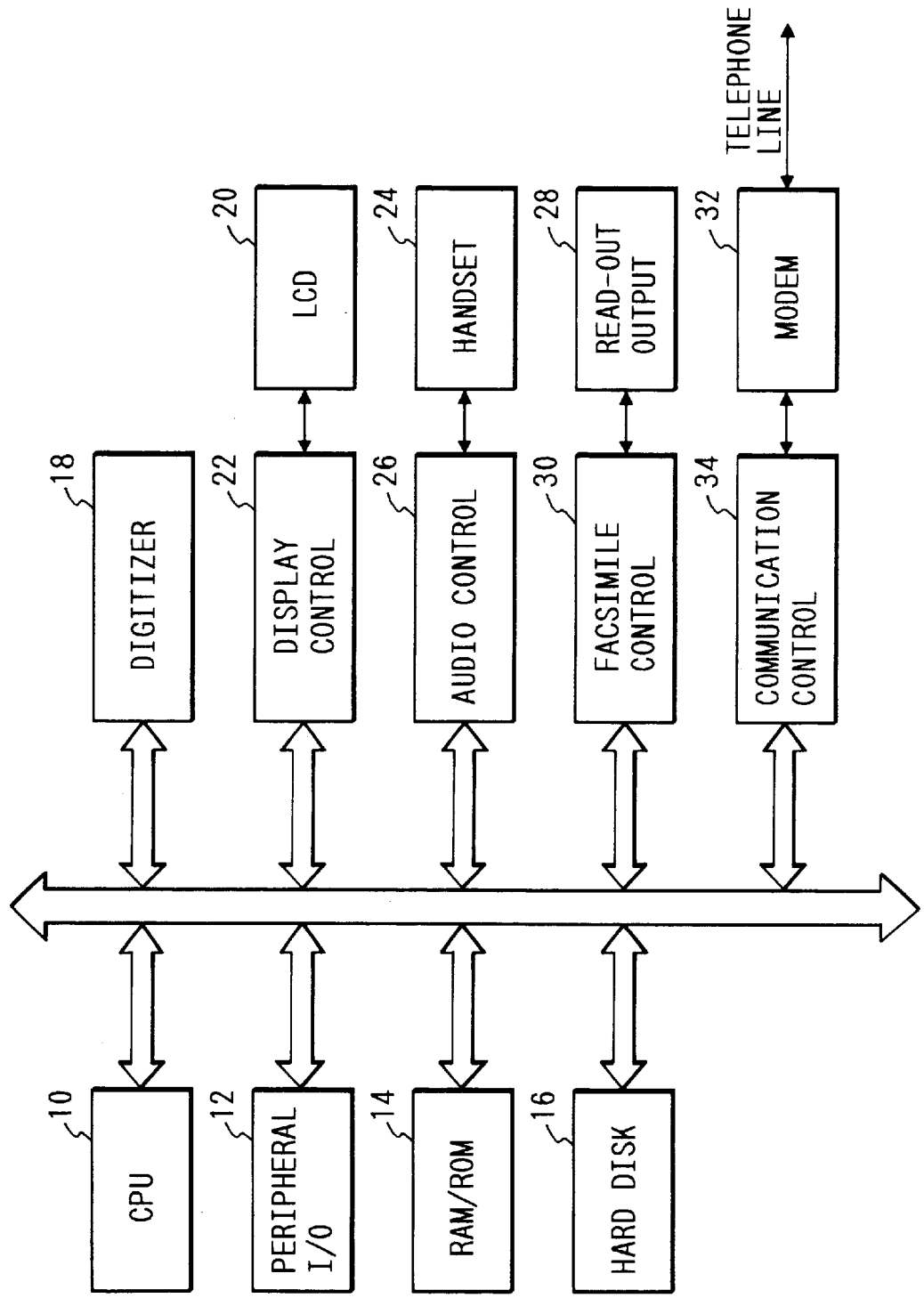
FIG. 1 is a block diagram showing a schematic construction of a whole facsimile apparatus according to an embodiment of the invention.

FIG. 1 is a block diagram showing a schematic construction of a facsimile apparatus according to an embodiment of the invention. Reference numeral 10 denotes a CPU for controlling the whole apparatus; 12 a peripheral input/output (I/O) circuits for performing a memory control and an I/O control; 14 a memory comprising an ROM and an RAM; 16 a hard disk as a secondary memory; and 18 a well-known digitizer serving as a coordinates input device which can solely or continuously input arbitrary coordinates by a pen, a stylus, or the like. In the embodiment, the digitizer 18 is arranged so as to be overlapped to a liquid crystal display (LCD) panel 20, so that an arbitrary locus can be inputted like a feeling such as to be overlapped to an image that is displayed on the liquid crystal display panel 20. Reference numeral 22 denotes a display control circuit for displaying a desired image to the LCD panel 20 under control of the CPU 10.

Reference numeral 24 denotes an audio I/O device (for example, handset) comprising a microphone and a speaker; 26 an audio control for controlling an audio input/output by the audio I/O device 24; 28 a read-out output device 28 (namely, an image scanner and a printer) for a facsimile transmission; 30 a facsimile control for controlling the read-out output device 28; 32 a modulating/demodulating apparatus (modem) for frequency modulating a signal to be transmitted to a frequency band that is suitable for a communication line and for demodulating the modulated signal from the communication line; and 34 a communication control circuit for controlling the connection and communication with the communication line such as a setting of a communication protocol or the like.

Figure 2:
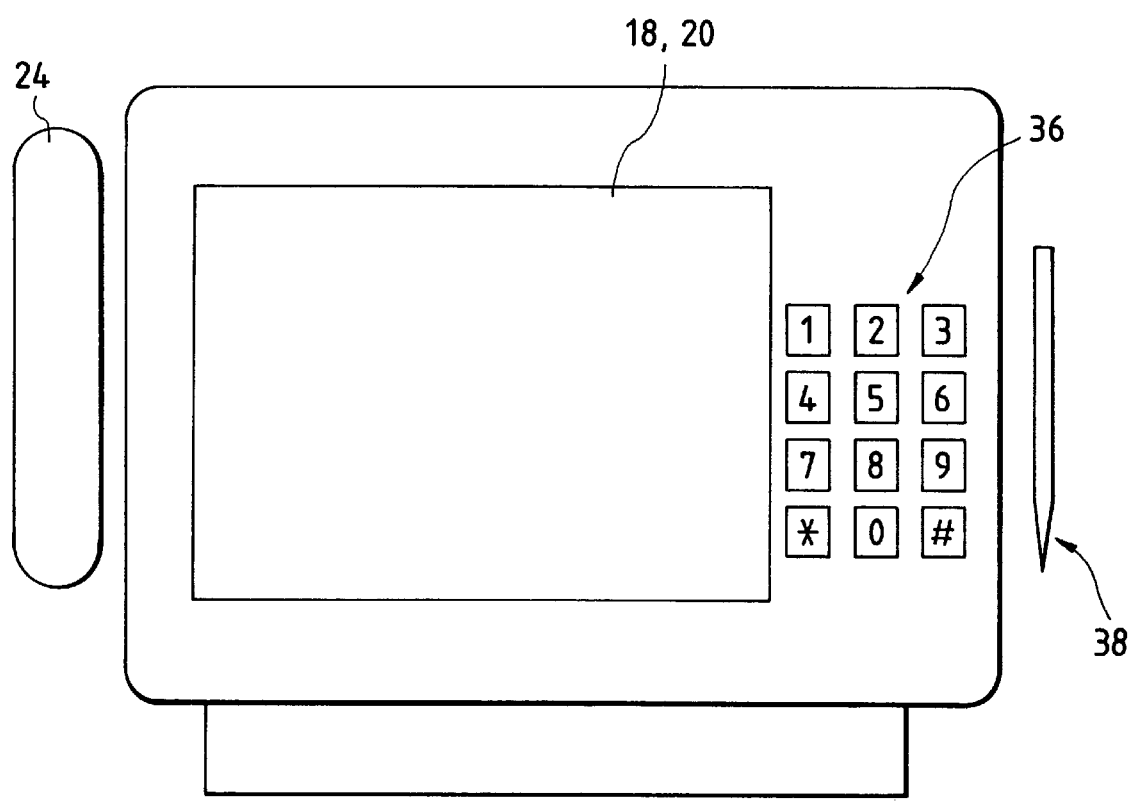
FIG. 2 is a front view showing an external view of the facsimile apparatus of FIG. 1.

FIG. 2 is a front view showing an external appearance of the facsimile apparatus of the embodiment. The LCD panel 20 and digitizer 18 are arranged at the front surface. The handset 24 is put on the left side. A ten-key 36 to input telephone numbers is arranged on the right side of the front surface. Reference numeral 38 denotes an input pen of the digitizer 18.

Figure 3:
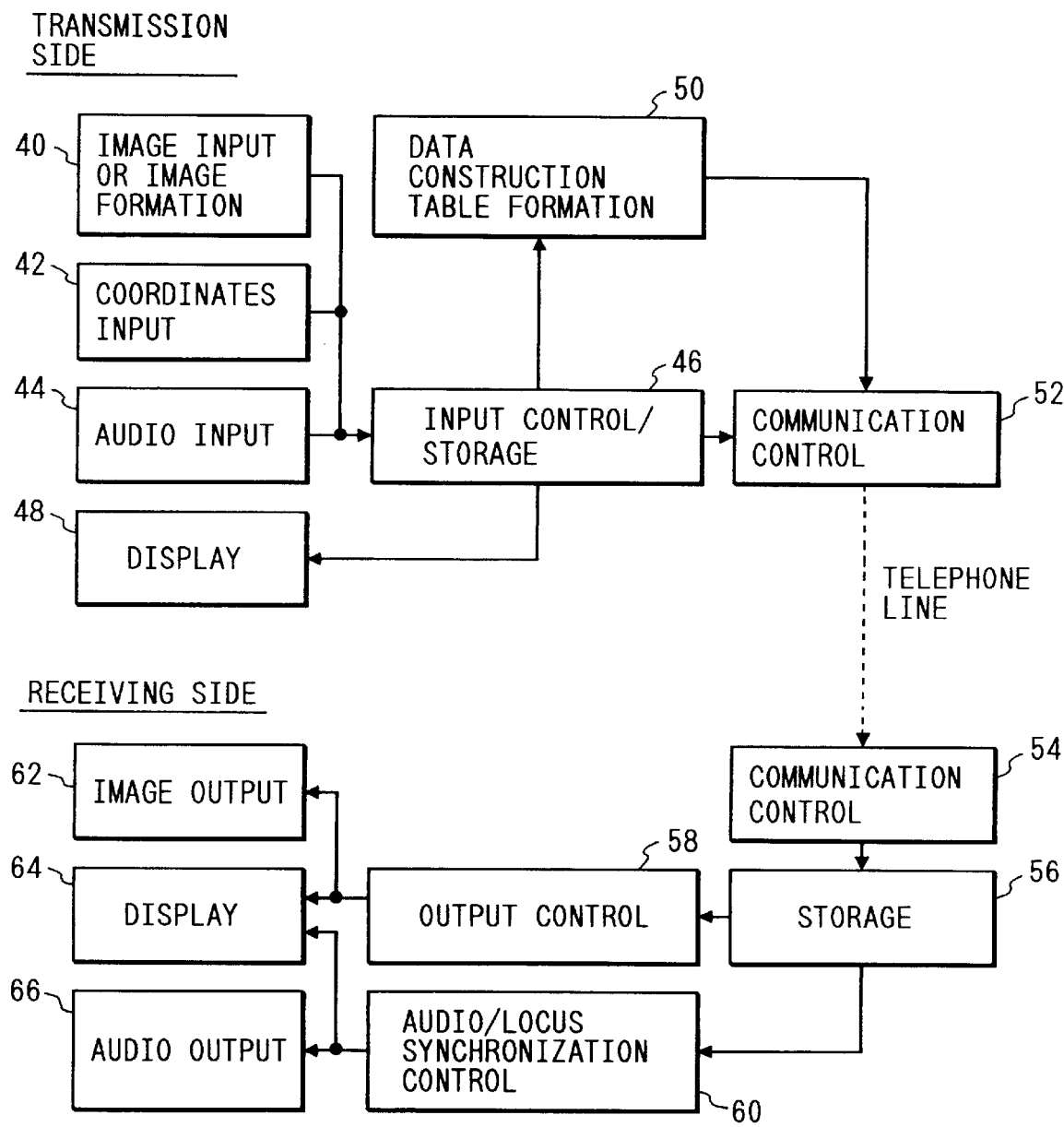
FIG. 3 is a block diagram in which main functions in the transmitting mode and receiving mode of the facsimile apparatus of FIG. 1 are shown as circuit blocks.

FIG. 3 is a block diagram in which main functions in the transmitting mode and receiving mode of the apparatus according to the embodiment are shown as circuit blocks.

Image input or image formation means 40 generates data of an image read by the read-out output device 28 or an image of a document formed by a word processor or a graphics creating software which operates on the present apparatus. Coordinates input means 42 is the digitizer 18 and calibrates the coordinates which are inputted by the pen 38, adjusts its timing, and generates as clear coordinate values. Audio input means 44 converts an analog audio signal inputted from the handset 24 into a digital signal and generates. Outputs of those means 40, 42, and 44 are supplied to input control/storage means 46 and stored as data.

Although the details will be explained hereinlater, when a message by a voice and a locus is added to the inputted image, the input control/storage means 46 displays the inputted image to display means 48 (namely, LCD panel 20). The user inputs an arbitrary locus by the digitizer 18 and inputs a voice by the handset 24 while looking at the display image.

Data construction table formation means 50 numbers the locus data every stroke and also numbers the audio data while setting a sound without a no-voice state of 0.5 second or more to one data group in a manner such that the inputted voice and coordinate train (locus) can be synchronously reproduced on the reception side, thereby forming a table to set a time-dependent flow. Each data of the inputted image, voice, and locus is transmitted through communication control means 52.

Communication control means 54 on the reception side receives information through the telephone line and writes the reception data into storage means 56. In response to a disclosure request of the user on the reception side, output control means 58 reads out the data of the reception image from the storage means and supplies to image output means 62 (printer of the readout output device 28) and/or display means 64 (LCD panel 20 and a display control circuit 22). When the audio/locus data has been added, the output control means 58 first supplies the reception image to the display means and allows the reception image to be displayed and also promotes the user to reproduce the audio/locus.

In response to an audio/locus reproduction request of the user, audio/locus synchronization control means 60 reads out the data regarding the audio and locus from the storage means 56, reproduces and processes the data in accordance with a time set of the table formed by the data construction table formation means 50, supplies the locus data to the display means 64, and supplies the audio data to audio output means 66. Thus, the locus inputted on the transmission side is displayed at the same position as that inputted on the transmission side so as to be overlapped to the reception image which is displayed by the display means 64. A voice is generated synchronously with it.

It will be obviously understood that in case of outputting the reception image by a paper, the image output means 62 is used.

Figure 4A:
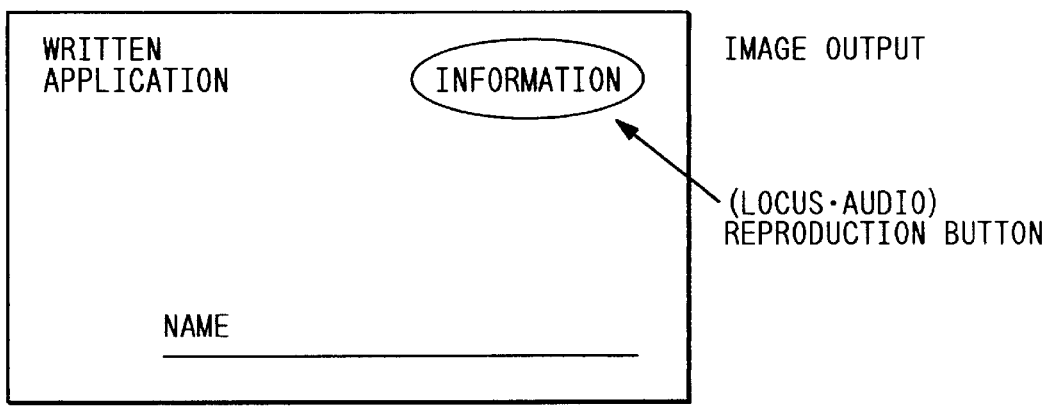
FIGS. 4A and 4B are diagrams showing examples of a display picture plane in the facsimile apparatus of FIG. 1.
Figure 4B:
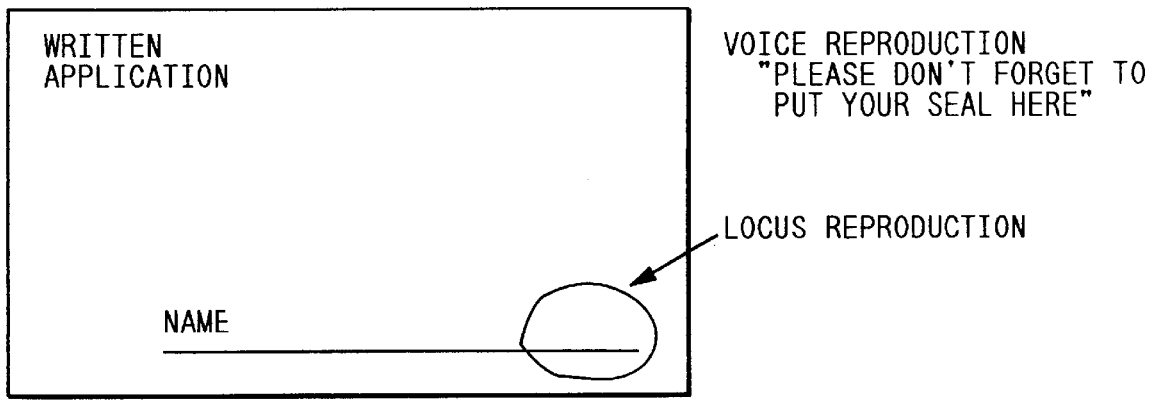

FIGS. 4A and 4B show examples of outputs (the display image of the display means 64 and the audio output of the audio output means 66) which are obtained on the reception side by the facsimile apparatus of the embodiment. FIG. 4A shows a picture plane of a written application which was transmitted. "Information" corresponds to a reproduction button of the locus and audio. By depressing the reproduction button on the reception side, a message "please don't forget to put your seal here" is reproduced by a voice. Synchronously with it, a locus to indicate a portion to put a seal on the display screen is reproduced and displayed.

Figure 5:
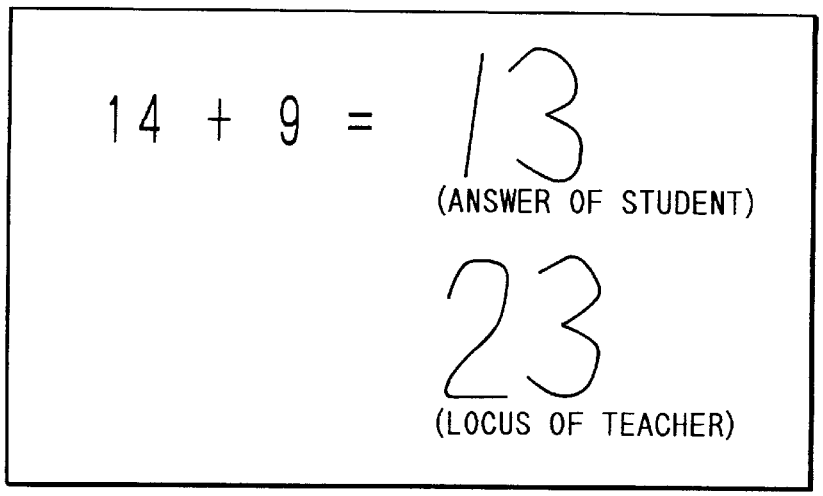
FIG. 5 is a diagram showing another example of the display picture plane in the facsimile apparatus of FIG. 1.
Figure 6:
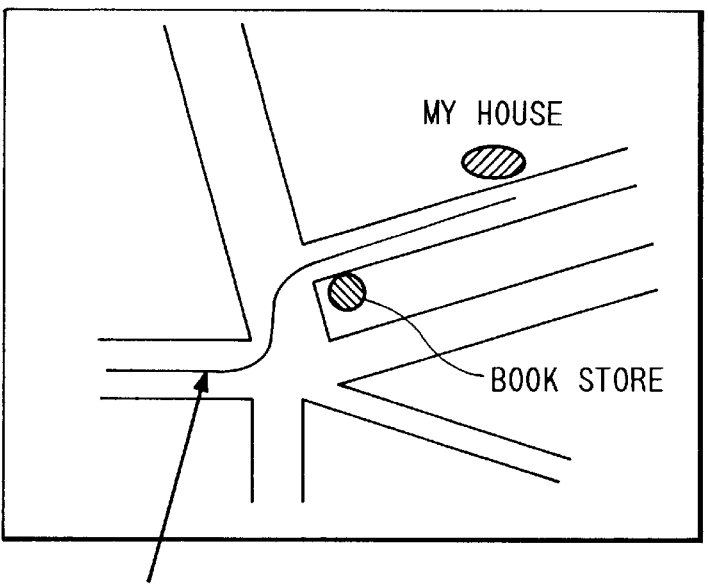
FIG. 6 is a diagram showing still another example of the display picture plane in the facsimile apparatus of FIG. 1.

FIG. 5 shows an example of a display on the picture plane for teaching of a supplementary school or a correspondence course or school. FIG. 6 shows an example of a display on the picture plane for guiding complicated roads. Voice and locus as shown in the diagrams are added, respectively.

Figure 7:
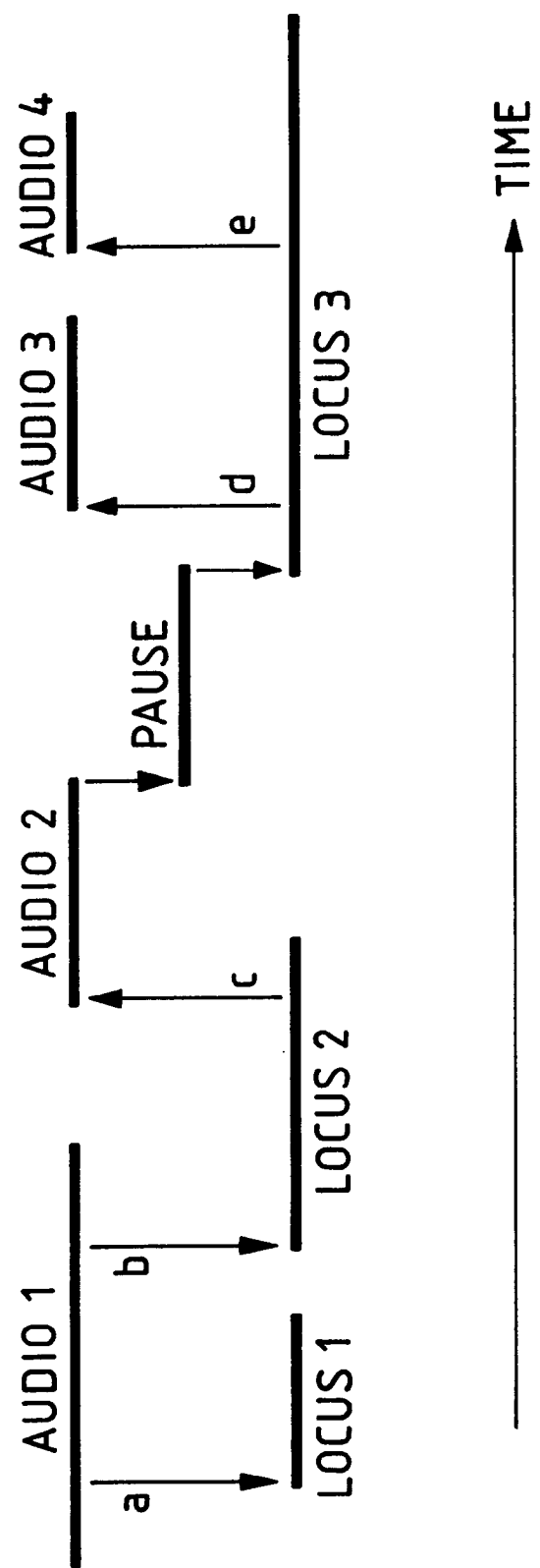
FIG. 7 is a time chart showing the correspondence relation between a voice and a locus which are inputted in the facsimile apparatus of FIG. 1.
Figure 8:
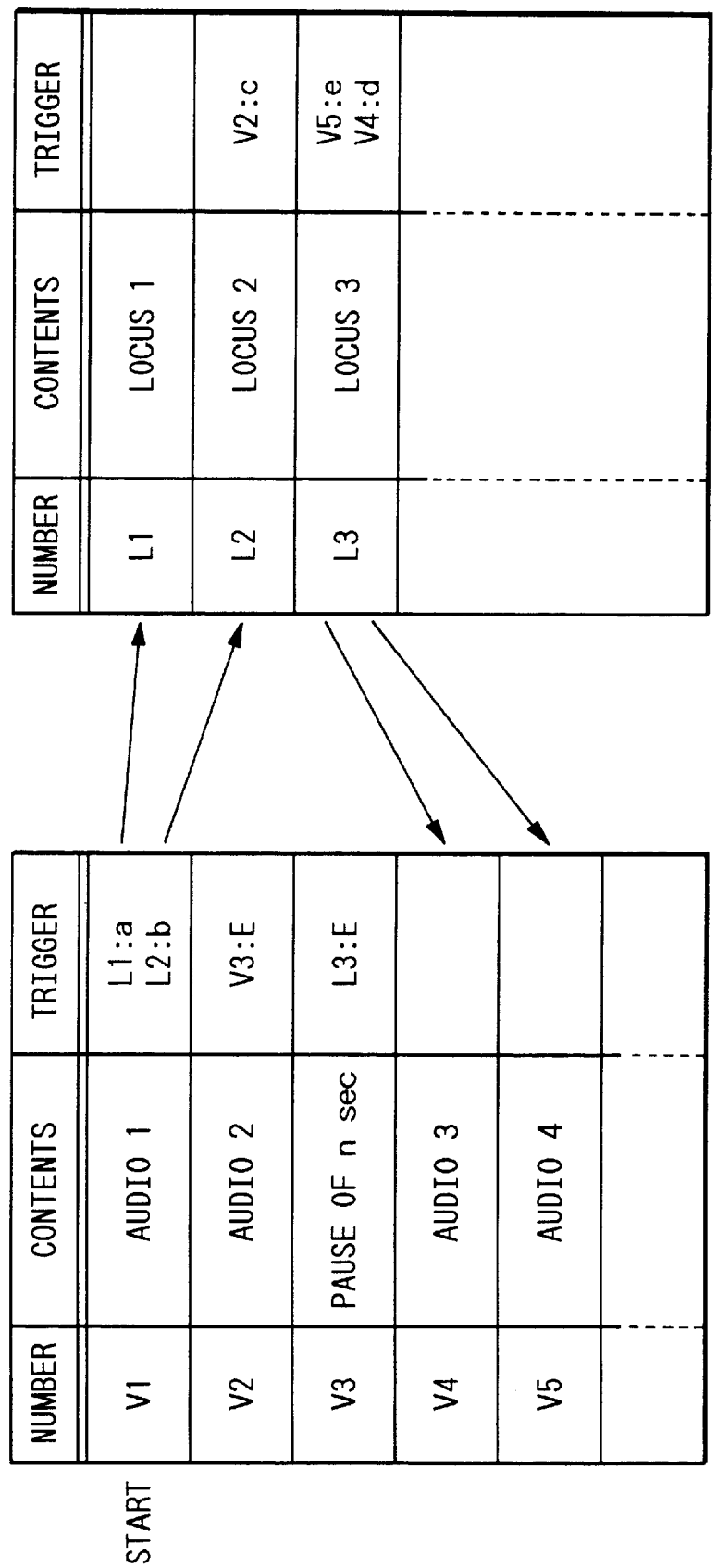
FIG. 8 is a diagram showing a table constructed to transmit the voice and locus in FIG. 7.

An example of a table forming procedure in the data construction table formation means 50 will now be described. FIG. 7 is a timing chart showing the correspondence relation between the audio and locus to be transmitted. FIG. 8 shows an example of the table for the example shown in FIG. 7. As shown in FIG. 7, audio and locus outputs are generally inputted mutually intermittently. For convenience of explanation, those data groups are referred to as audio 1, audio 2, locus 1, locus 2, . . . . Reference characters a, b, c, d, and e denote triggers to start the reproduction of the other data and their contents indicate the periods of time from a timing when the reproduction of each data group has been started until a timing when the reproduction of the other data is started. Namely, the audio (or locus) which continues long activates the locus (or audio). When both of the audio and locus are interrupted, the apparatus pauses. For a pause duration, the kind of output is set to either one of the audio and the locus. Reference character E indicates that the reproduction of the data group is finished and there is no data. By alternately performing a trigger, the time control can be easily performed and the data for such a period of time can be also deleted. Such a control contributes to a reduction of a data amount.

Figure 9:
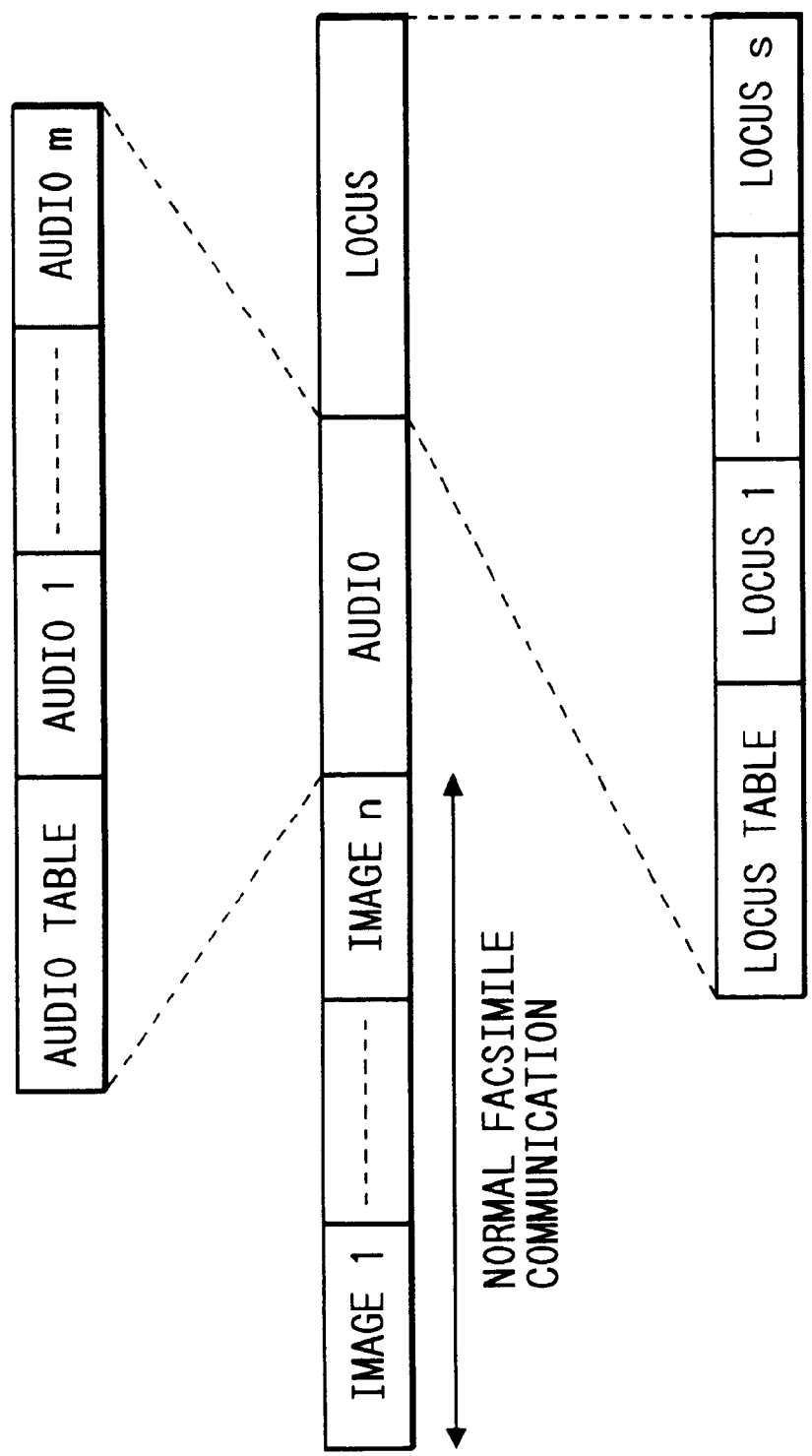
FIG. 9 is a diagram showing a format of transmission data including an image, a voice, and a locus in the apparatus of FIG. 1.

FIG. 9 shows a format of transmission data including image data, audio data, and locus data. First, in a manner similar to the conventional facsimile apparatus, an image is transmitted and, after that, an audio table and an audio data group are transmitted and a locus table and a locus data group are subsequently transmitted.

Figure 10:
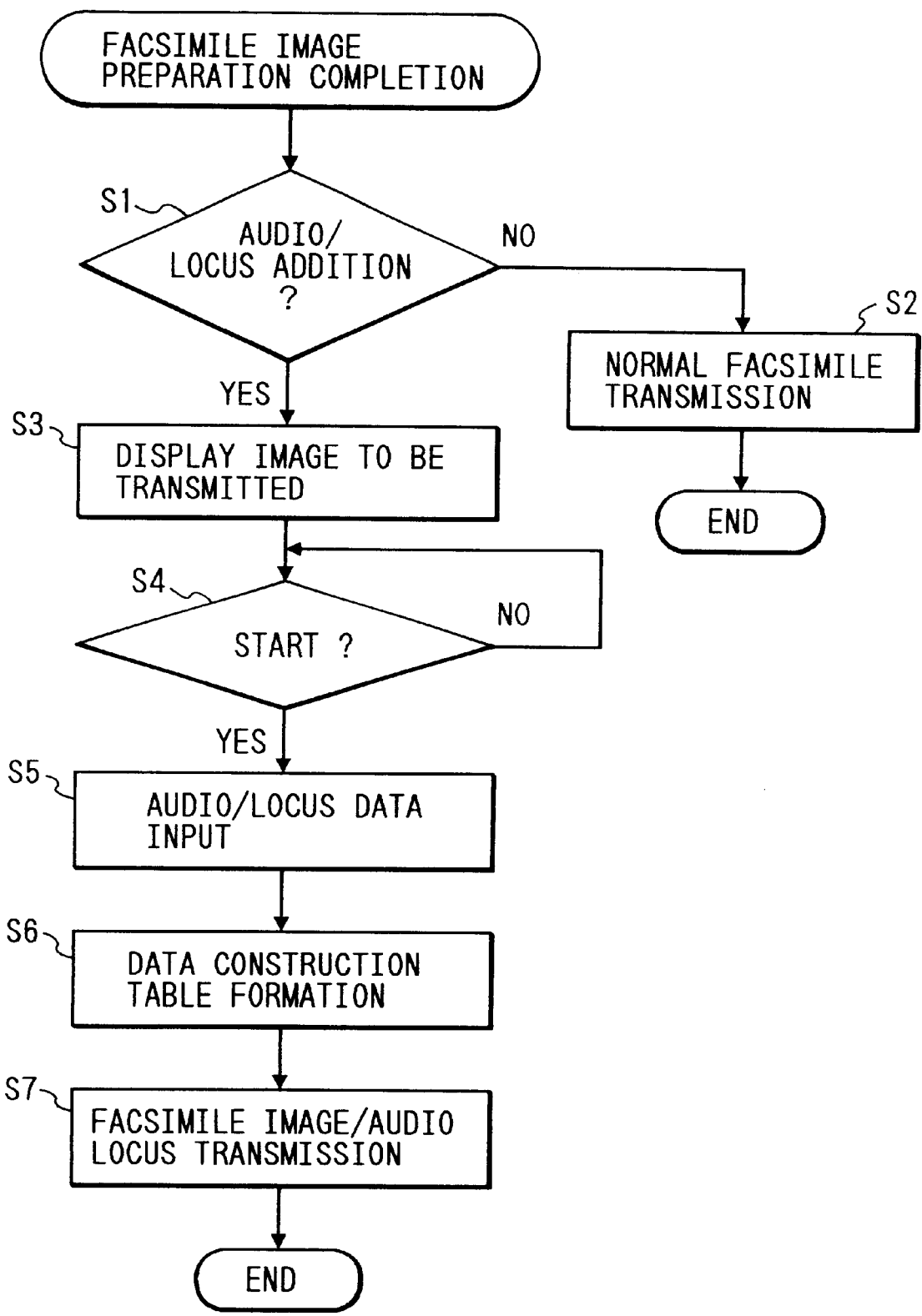
FIG. 10 is a flowchart showing the fundamental operation on the transmission side in the apparatus of FIG. 1.

FIG. 10 is a flowchart showing the fundamental operation on the transmission side of the apparatus according to the embodiment. Whether audio/locus are added after the image was read or formed or not is asked to the user (step S1). When no audio/locus is added (S1), the normal facsimile transmission is executed as it is (S2). When audio/locus are added, an image to be transmitted is displayed on the picture plane of the display means 48 (S3). The apparatus waits for an instruction to start the input of the audio/locus (S4). When the audio/locus input is started, the audio/locus input data is stored (S5). A data group as shown in FIG. 8 is constructed and a table showing the relation between the time and the trigger is formed (S6) and is transmitted together with the input image (S7).

Figure 11:
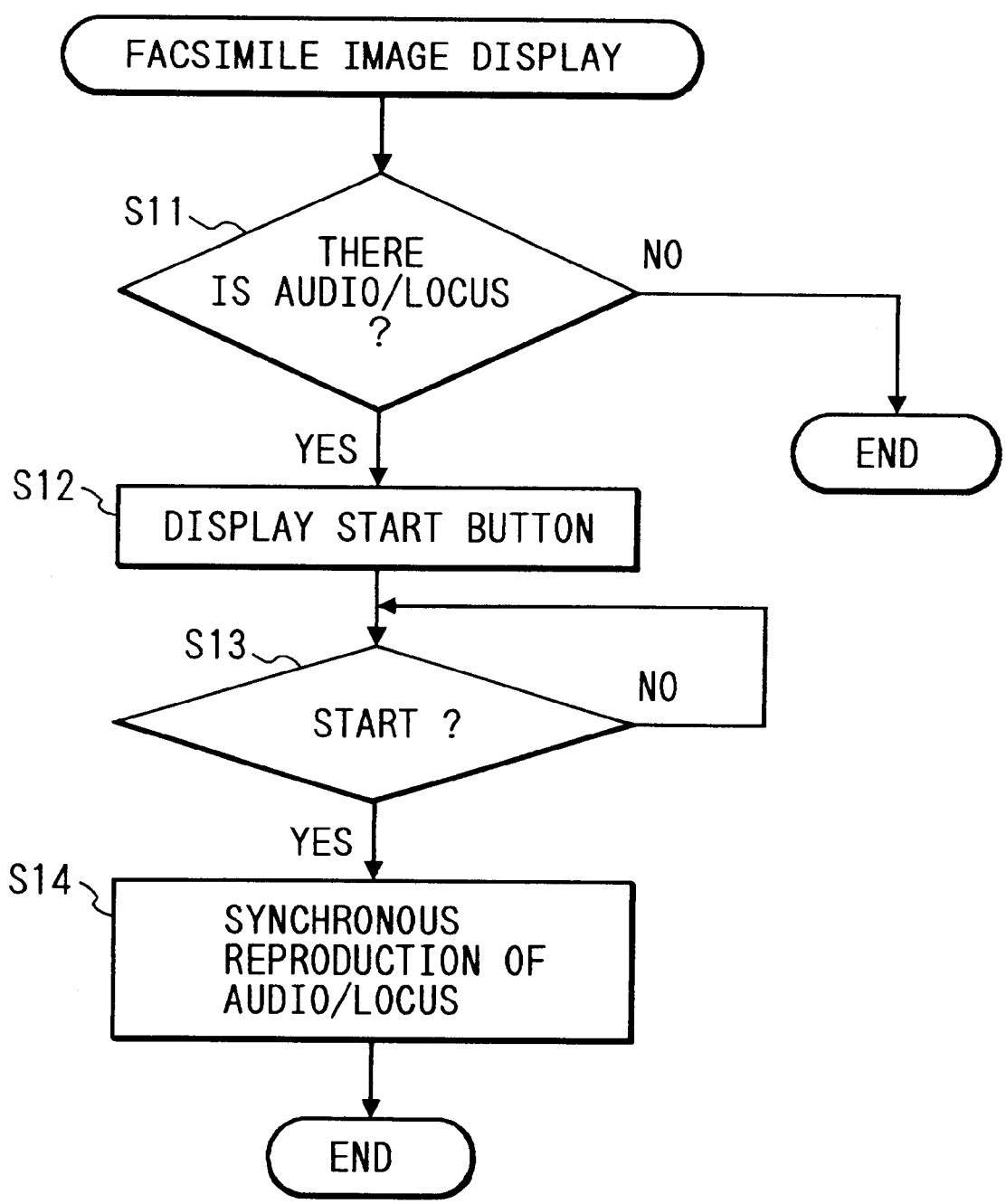
FIG. 11 is a flowchart showing the fundamental operation on the reception side in the apparatus of FIG. 1.

FIG. 11 is a flowchart showing the fundamental operation on the reception side of the apparatus of the embodiment. After the reception image was displayed on the display means 64 by an instruction of the user, a check is made to see if the audio/locus data has been added or not (S11). If NO, the processing routine is finished there. If YES (S11), a start button indicative of the existence of the audio/locus data is displayed (S12). The apparatus waits for the depression of the start button (S13). The audio and locus are synchronously reproduced in accordance with the received table (S14).

Figure 12A:
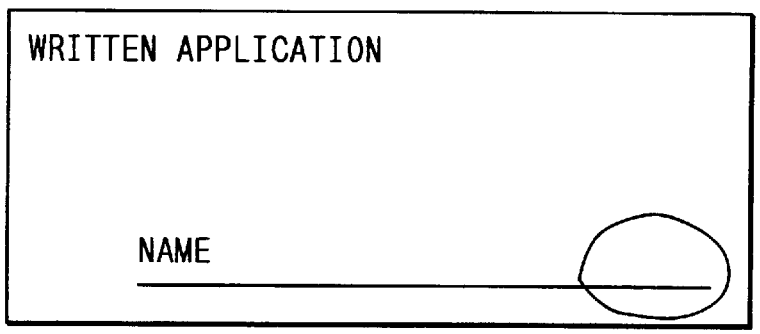
FIGS. 12A, 12B, and 12C are diagrams showing examples of picture planes showing locus displays in the apparatus of FIG. 1.
Figure 12B:
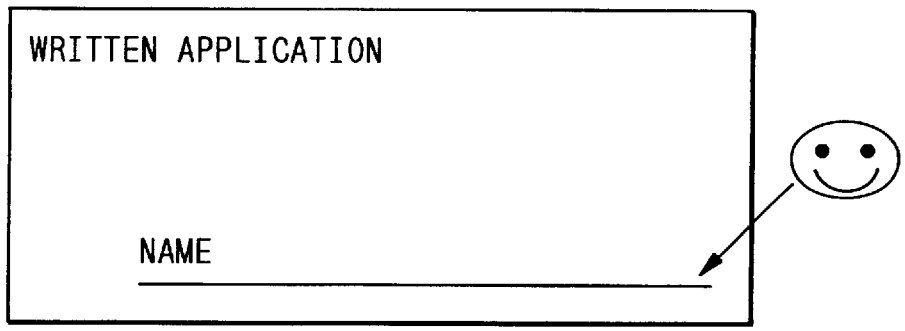
Figure 12C:
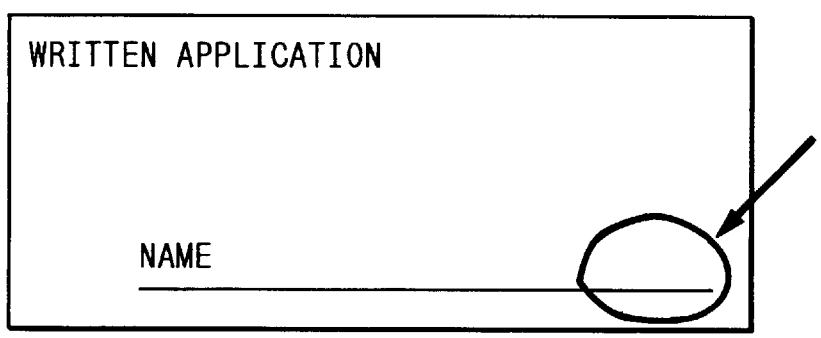

With respect to the locus, it can be reconstructed at a high fidelity as shown in FIG. 12A. However, instead of reconstructing the locus data as it is, as shown in FIG. 12B, an arrow cursor or icon can be also moved so as to reconstruct only its motion. Further, as shown in FIG. 12C, a thickness (and color) of locus can be also originally changed on the reception side.

Although the facsimile transmission has been described as an example, the invention can be also obviously applied to a transmitting system of an electronic mail or the like.

According to the embodiment as mentioned above, an audio and a locus for compensating it are transmitted as a message for explaining together with a transmission image and, on the reception side, the image is displayed and the audio and locus can be synchronously reproduced, so that an understanding degree of the contents to be transmitted is further improved. The transmitter doesn't need to make sentences of the description as well and can input and output by the audio and locus in a manner similar to the case of normally explaining, so that a use efficiency is improved.

Although the audio and locus data have been added to the image in the above embodiment, another image can be also added to them. An embodiment in which an image synchronized with the audio/locus data can be also added will now be described hereinbelow. The apparatus of the construction of FIG. 1 can be applied as it is as a whole construction itself of such an embodiment. The embodiment is useful in, for example, a scene such as an information presentation or the like. FIG. 13 shows an example of a display picture plane including such a sub-image. A main image is a map of a restaurant and its location is described by a voice. After that, an image of a recommended menu (healthy bento of a lunch menu) is displayed so as to be adhered onto the map (main image). The image of the recommended menu is displayed synchronously with the audio. When such a sub-image exists, the data construction table formation means 50 forms a table regarding the reproduction times of the locus and sub-image and the trigger.

FIG. 14 shows a format of transmission data including the sub-image data as mentioned above. The data group of the sub-image includes the contents of the sub-image and the coordinates data indicating at which portion of the main image the sub-image is adhered.

FIG. 15 is a flowchart showing the operation on the transmission side of the apparatus when there is a sub-image. It is preferable that the sub-image is previously inputted or formed and is moved or adhered at a desired position as necessary. After the main image was read or formed, whether the audio/locus/sub-image are added or not is asked to the user (S21). When none of the audio, locus, and sub-image is added (S21), the normal facsimile transmission is executed as it is (S22). When they are added, the main image is displayed to the screen of the display means 48 (S23). The apparatus waits for an instruction to start the input of the audio/locus/sub-image (S24). After the input was started, the input data of the audio/locus/sub-image is stored (S25). The data group to be transmitted is constructed and the table indicative of the relation between the time and the trigger for synchronous reproduction is formed (S26) and is transmitted together with the main image (FAX image) (S27).

FIG. 16 is a flowchart showing the operation on the reception side of the apparatus. After the reception image was displayed by the display means 64 by an instruction of the user, a check is made to see if the audio/locus/sub-image data has been added or not (S31). If NO, the processing routine is finished there. When they are added (S31), the start button indicative of the existence of the audio/locus/sub-image data is displayed (S32). The apparatus waits for the depression of the start button (S33). The audio, locus, and sub-image are synchronously reproduced in accordance with the received table (S34).

In the embodiment, although the sub-image has been displayed so as to be adhered to the main image, the sub-image can be also displayed by a page feeding system like a picture-card show such that the main image is erased and the sub-image is displayed as a next image. Further, the sub-image can be also moved or erased together with the audio and locus.

As mentioned above, since another image is displayed in addition to the audio and locus, an expressing power of the explanation can be further improved.

As will be easily understood from the above description, according to the invention, in addition to the ordinary image transmission, audio and locus and, further, another image can be synchronously reproduced. Therefore, an understanding degree of information is improved. Further, since there is no need to make sentences of the additional explanation each time as well, the troublesomeness on the transmission side can be also omitted.

What is claimed is:

1. A data transmitting apparatus comprising:
means for forming image information,
means for forming appendix image information which is to be displayed with an image represented by said image information and indicates a portion to be explained, of the image represented by said image information;
means for forming audio information for explanation of an image corresponding to said portion;
means for coordinate input; and
means for transmitting said image information, said appendix image information and said audio information by a single communication,
wherein the appendix image information includes locus information of map information.

2. An apparatus according to claim 1, wherein said appendix image information is information indicative of a locus on said image information.

3. An apparatus according to claim 1, wherein together with said audio information, said transmitting means transmits instruction data indicative of said appendix image information which is reproduced together with said audio information.

4. An apparatus according to claim 3, wherein said transmitting means further transmits timing data indicative of a reproducing timing of the appendix image information instructed by said instruction data.

5. An apparatus according to claim 4, wherein said timing data indicates a time from the start of the reproduction of said audio information to the start of the reproduction of the appendix image information instructed by said instruction data.

6. An apparatus according to claim 1, wherein together with said appendix image information, said transmitting means transmits instruction data indicative of said audio information which is reproduced together with said appendix image information.

7. An apparatus according to claim 6, wherein said transmitting means further transmits timing data indicative of a reproducing timing of the audio information instructed by said instruction data.

8. An apparatus according to claim 7, wherein said timing data indicates a time from the start of the reproduction of said appendix image information to the start of the reproduction of the audio information instructed by said instruction data.

9. An apparatus according to claim 1, further comprising means for forming sub-image information different from said image information,
and wherein said transmitting means also transmits said sub-image information.

10. An apparatus according to claim 1, further comprising means for deciding whether said audio information and said appendix image information are transmitted together with said image information or not.

11. An apparatus according to claim 10, further comprising display means for displaying said image information before transmitting.

12. An apparatus according to claim 11, wherein said display means operates in case of transmitting said audio information and said appendix image information and doesn't operate in the case where said audio information and said appendix image information are not transmitted.

13. A data transmitting method comprising the steps of:
forming image information;
forming appendix image information which is to be displayed with an image represented by said image information and indicates a portion to be explained, of the image represented by said image information;
forming audio information for explanation of an image corresponding to said portion;
inputting coordinates; and
transmitting said image information, said appendix image information and said audio information by a single communication,
wherein the appendix image information includes locus information of map information.

14. A method according to claim 13, wherein said appendix image information is information indicative of a locus on said image information.

15. A method according to claim 13, wherein instruction data indicative of the appendix image information which is reproduced together with said audio information is transmitted together with said audio information.

16. A method according to claim 15, wherein timing data indicative of a reproducing timing of the appendix image information instructed by said instruction data is further transmitted.

17. A method according to claim 16, wherein said timing data indicates a time from the start of the reproduction of said audio information to the start of the reproduction of the appendix image information instructed by said instruction data.

18. A method according to claim 13, wherein instruction data indicative of the audio information which is reproduced together with said appendix image information is transmitted together with said appendix image information.

19. A method according to claim 18, wherein timing data indicative of a reproducing timing of the audio information instructed by said instruction data is further transmitted.

20. A method according to claim 19, wherein said timing data indicates a time from the start of the reproduction of said appendix image information to the start of the reproduction of the audio information instructed by said instruction data.

21. A method according to claim 13, further comprising the step of forming sub-image information different from said image information,
and wherein said sub-image information is also transmitted.

22. A method according to claim 13, further comprising the step of deciding whether said audio information and said appendix image information are transmitted together with said image information or not.

23. A method according to claim 22, further comprising the step of displaying said image information before transmitting.

24. A method according to claim 23, wherein in case of transmitting said audio information and said appendix image information, said display is performed and, in the case where said audio information and said appendix image information are not transmitted, said display is not executed.

25. A data transmitting apparatus comprising:
means for forming image information, appendix image information which is to be displayed with an image represented by said image information and indicates a portion to be explained, of the image represented by said image information, and audio information for explanation of an image corresponding to said portion;

means for coordinate input; and means for transmitting said image information, said audio information, and said appendix image information, wherein the appendix image information includes locus information of map information.

26. An apparatus according to claim 25, wherein said appendix image information indicates a position corresponding to said image information.

27. An apparatus according to claim 25, further comprising means for deciding whether said audio information and said appendix image information are transmitted together with said image information or not.

28. An apparatus according to claim 27, further comprising display means for displaying said image information before transmitting.

29. An apparatus according to claim 28, wherein said display means operates in case of transmitting said audio information and said appendix image information and doesn't operate in the case where said audio information and said appendix image information are not transmitted.

30. A data transmitting method comprising the steps of:

forming image information, appendix image information which is to be displayed with an image represented by said image information and indicates a portion to be explained, of the image represented by said image information, and audio information for explanation of an image corresponding to said portion;

inputting coordinates; and transmitting said image information, said audio information, and said appendix image information, wherein the appendix image information includes locus information of map information.

31. A method according to claim 30, wherein said appendix image information indicates a position corresponding to said image information.

32. A method according to claim 30, further comprising the step of deciding whether said audio information and said appendix image information are transmitted together with said image information.

33. A method according to claim 32, further comprising the display step of displaying said image information before transmitting.

34. A method according to claim 33, wherein said display step is made operative in case of transmitting said audio information and said appendix image information and is not made operative in the case where said audio information and said appendix image information are not transmitted.

35. A data receiving apparatus comprising:

means for receiving image information, appendix image information which is to be displayed with an image represented by said image information and indicates a portion to be explained, of the image represented by said image information, and audio information for explanation of an image corresponding to said portion; and reproducing means for reproducing said image information and said audio information and displaying a position indicated by said appendix image information onto said image, wherein the appendix image information includes locus information of map information obtained from coordinate input means.

36. An apparatus according to claim 35, wherein said appendix image information is information indicative of a locus on said image information.

37. An apparatus according to claim 35, wherein said receiving means receives instruction data indicative of the correspondence between said audio information and said appendix image information, and said reproducing means controls the reproducing operation of said audio information and said appendix image information in accordance with said instruction data.

38. An apparatus according to claim 35, wherein said receiving means further receives timing data indicative of a reproducing timing of said audio information and said appendix image information, and said reproducing means decides the reproducing timing of said appendix image information in accordance with said instruction data.

39. An apparatus according to claim 35, wherein said receiving means receives sub-image information different from said image information, and said reproducing means reproduces said sub-image information together with said image information.

40. An apparatus according to claim 35, further comprising means for deciding whether said audio information and said appendix image information are reproduced together with said image information or not.

41. An apparatus according to claim 40, further comprising display means for displaying said image information, and wherein said display means displays for making said deciding means operative.

42. A data receiving method comprising the steps of:

receiving image information, appendix image information which is to be displayed with an image represented by said image information and indicates a portion to be explained, of the image represented by said image information, and audio information for explanation of an image corresponding to said portion; and reproducing said image information and said audio information and displaying a position indicated by said appendix image information onto said image, wherein the appendix image information includes locus information of map information obtained from coordinate input means.

43. A method according to claim 42, wherein said appendix image information is information indicative of a locus on said image information.

44. A method according to claim 42, wherein instruction data indicative of a correspondence between said audio information and said appendix image information is received, and the reproducing operation of said audio information and said appendix image information are controlled in accordance with said instruction data.

45. A method according to claim 42, wherein timing data indicative of a reproducing timing of said audio information and said appendix image information is further received, and a reproducing timing of said appendix image information is decided in accordance with said instruction data.

46. A method according to claim 42, wherein sub-image information different from said image information is received and said sub-image information is also reproduced together with said image information.

47. A method according to claim 42, further comprising the step of deciding whether said audio information and said appendix image information are also reproduced together with said image information or not.

48. A method according to claim 47, further comprising the display step of displaying said image information, and wherein a display to decide whether said audio information and said appendix image information are reproduced together with said image information or not is executed in said display step.

49. A data receiving apparatus comprising:

means for receiving first image information indicating a first image, second image information which is to be displayed with the first indicated by said first image information and is associated with a portion to be explained, of said first image, and audio information for explanation;

display and reproducing means for displaying said first image and a second image corresponding to said second image information within one picture and reproducing said audio information, wherein the image information includes locus information of map information obtained from coordinate input means; and print means for printing said first image.

50. An apparatus according to claim 49, wherein said second image is a locus displayed in the received image and said second image information represents a position of said locus.

51. An apparatus according to claim 49, wherein said second image is a subordinate image attached to said first image, and said second information represents said subordinate image.

52. A data receiving method comprising the steps of:

receiving first image information indicating a first image, second image information which is to be displayed with the first image indicated by said first image information and is associated with a portion to he explained, of said first image, and audio information for explanation;

displaying said first image and a second image corresponding to said second image information within one picture and reproducing said audio information, wherein the image information includes locus information of map information obtained from coordinate input means; and printing said first image.

* * * * *

UNITED STATES PATENT AND TRADEMARK OFFICE
CERTIFICATE OF CORRECTION

PATENT NO.    : 6,275,305 B1
DATED         : August 14, 2001
INVENTOR(S)   : Shimada It is certified that error appears in the above-identified patent and that said Letters Patent is hereby corrected as shown below:

Column 4,
Line 63, insert -- ..., -- after "audio 2,"

Column 12,
Line 9, delete "he" and insert therefor -- be --

Signed and Sealed this

Twelfth Day of March, 2002

Attest:

Attesting Officer

JAMES E. ROGAN
Director of the United States Patent and Trademark Office